US006346208B1

(12) United States Patent
Müller et al.

(10) Patent No.: US 6,346,208 B1
(45) **Date of Patent: *Feb. 12, 2002**

(54) METHOD FOR MANUFACTURING AN ASSEMBLY COMPRISING A HARD PLASTIC WATCH CASE AND AT LEAST ONE PUSH BUTTON

(75) Inventors: Jacques Müller, Reconvilier; Rolf Widmer, Bienne; Clément Meyrat, Le Landeron, all of (CH)

(73) Assignee: SMH Management Services AG, Biel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/393,624

(22) Filed: Sep. 10, 1999

Related U.S. Application Data

(62) Division of application No. 08/852,403, filed on May 7, 1997, now Pat. No. 6,000,842.

(30) Foreign Application Priority Data

May 17, 1996 (FR) ........................................... 96 06155

(51) Int. Cl.[7] ............................................. B29C 45/14
(52) U.S. Cl. .................... 264/255; 264/308; 264/328.7
(58) Field of Search ................................ 264/255, 246, 264/328.7, 308

(56) References Cited

U.S. PATENT DOCUMENTS

| | | | | |
|---|---|---|---|---|
| 3,621,649 A | | 11/1971 | Vulcan et al. | 58/90 B |
| 3,973,099 A | | 8/1976 | Morris | 368/308 |
| 4,459,256 A | * | 7/1984 | Ziegler | 264/152 |
| 4,511,260 A | | 4/1985 | Pasquier | 368/69 |
| 5,795,525 A | * | 8/1998 | Naritomi | 264/251 |

FOREIGN PATENT DOCUMENTS

| | | |
|---|---|---|
| CH | 560 923 | 4/1975 |
| CH | 676 186 | 12/1999 |
| DE | 2 850 976 | 5/1979 |
| DE | 3 115 271 | 3/1982 |
| DE | 94 15 401 | 1/1996 |
| EP | 0 452 254 | 10/1991 |
| GB | 2 077 506 | 12/1981 |

* cited by examiner

*Primary Examiner*—Jan H. Silbaugh
*Assistant Examiner*—Edmund H. Lee
(74) *Attorney, Agent, or Firm*—Griffin & Szipl, P.C.

(57) ABSTRACT

The assembly according to the invention comprises a hard plastic watch case (2), having on its middle part one or more sealed push buttons (5) made in an inexpensive manner. Each push button (5) comprises a hard plastic stem (10), for example the same material as the case, and an elastomer flexible head (12) which is over molded onto an external surface (15) of the case. The case and the push buttons may be manufactured by injecting two materials in a single mold. The invention applies to electronic watches and to mechanical watches.

7 Claims, 2 Drawing Sheets

Fig. 2
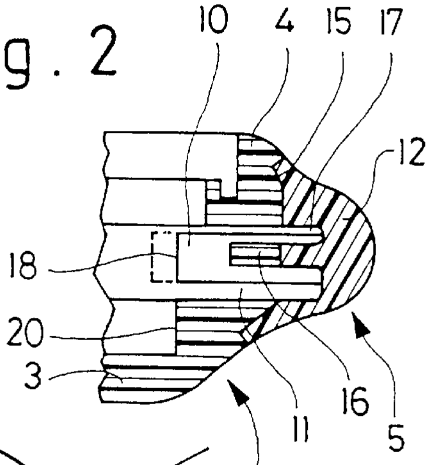
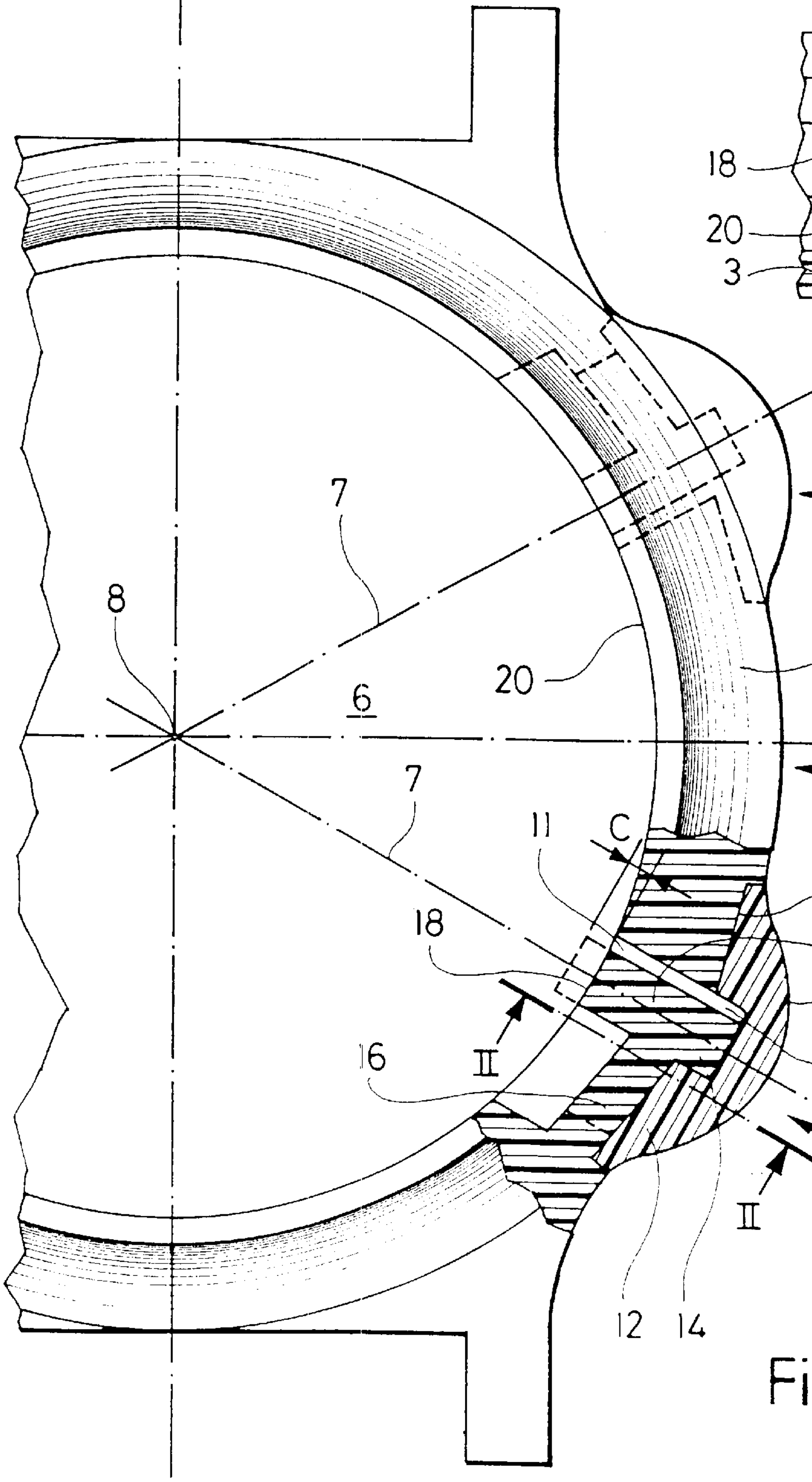
Fig . 1

Fig. 4
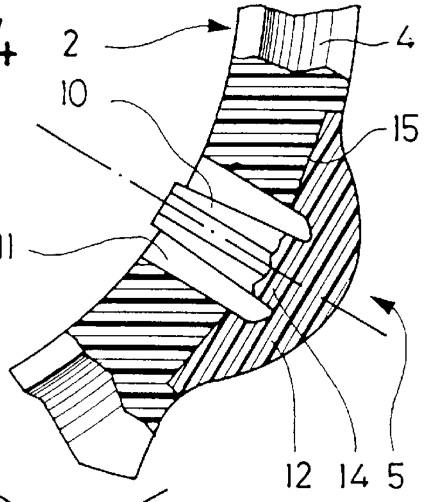
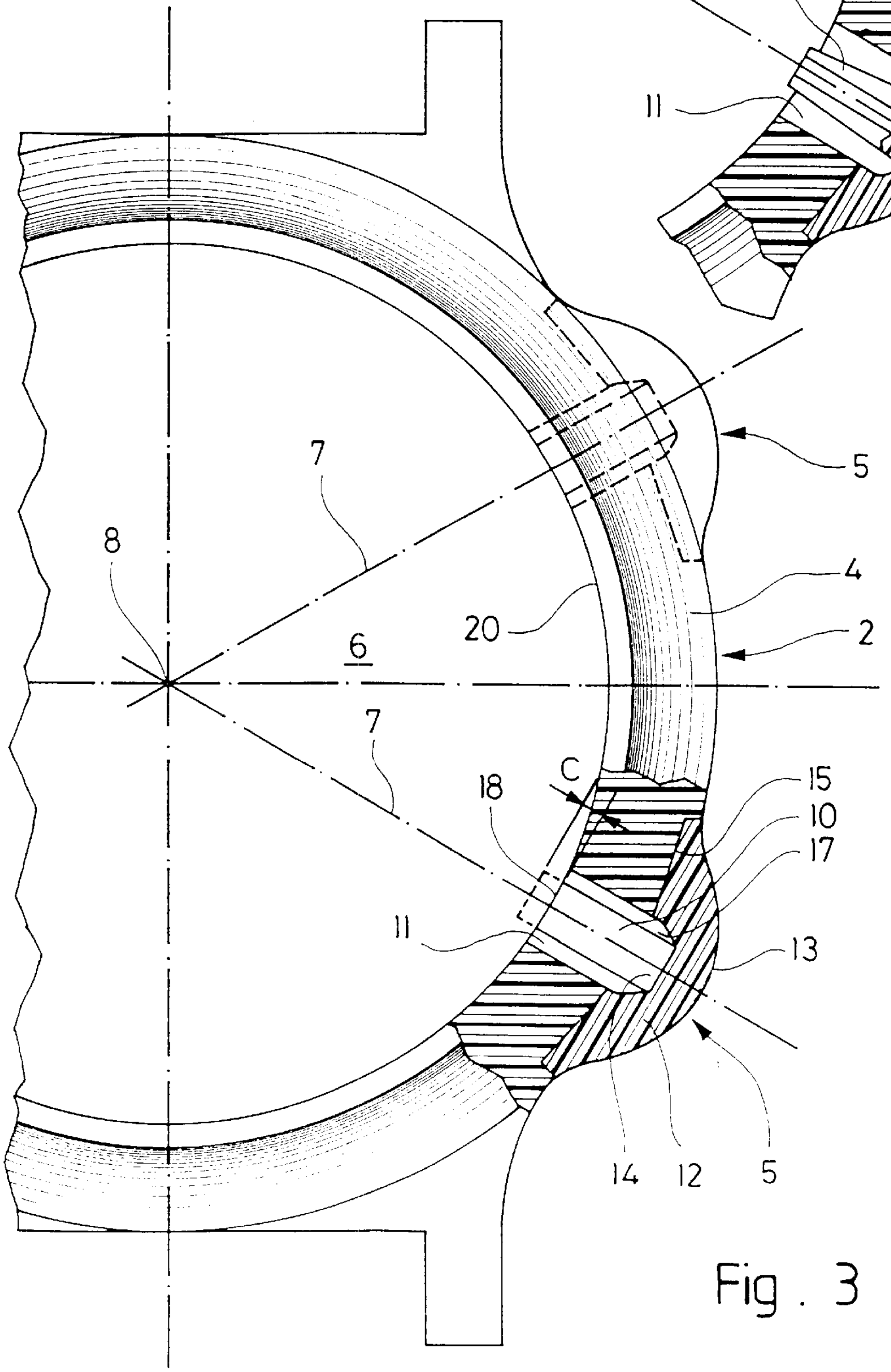
Fig. 3

METHOD FOR MANUFACTURING AN ASSEMBLY COMPRISING A HARD PLASTIC WATCH CASE AND AT LEAST ONE PUSH BUTTON

This application is a division of U.S. patent application Ser. No. 08/852,403,which was filed on May 7, 1997, now U.S. Pat. No. 6,000,842.

The present invention concerns a method for manufacturing an assembly comprising a hard plastic watch case and at least one push button having a stem and a flexible head projecting outside the case, the stem extending from the head through a lateral opening of the case, the flexible head being attached to the stem and the case and closing said opening in a sealed manner.

Push buttons of this type generally have a small travel, which destines them above all for controlling an electric contact in an electronic watch, for example a chronograph or a multi-function watch, but application thereof to a watch having a mechanical movement may also be envisaged.

Patent document GB-A-2 077 506 discloses a watch case having push buttons of this type, except that the stem does not completely pass or does not pass at all through the opening of the case. The stem and the external head of the push button are made of a single moulded hard plastic part. The head has a wall thin enough to be slightly flexible, to allow thus a small longitudinal travel of the stem and to act as return spring. The free end of the stem carries a conductive rubber plate which, when the push button is pressed, abuts two fixed contacts to connect them electrically. The periphery of the flexible head is in the shape of a cylindrical skirt which, in a first embodiment of the push button, is glued in a sealed manner against the wall of the opening of the case. In another embodiment, the moulded part is integral with the case, the skirt being directly connected to the case around the opening.

A push button head of this type must have a large enough diameter for the head to be flexible. This is possible in the case of the aforecited document because the push buttons are situated on an upper face of the case. Conversely, they could not be situated on the lateral wall of a wristwatch (the portion called the middle part), because the height of this wall is generally very limited. Moreover, repeated flexion of the hard plastic flexible head could eventually detach or split the skirt thereby affecting the sealing and operation of the push button.

The present invention aims to avoid the aforementioned drawbacks, as a result of a push button able to be made at low cost via moulding method and in such a way that the push button may be situated on the middle part of a wristwatch.

One aspect of the invention concerns an assembly of the type indicated hereinbefore, characterised in that the flexible head is made of an elastomeric material and is fixed in a sealed manner on an external surface of the case around the opening.

Due to the fact that it has very high capacity to be deformed elastically and is fixed on an external surface of the case and not in the opening, the elastomeric material of the flexible head allows a relatively narrow pusher to be made in the direction of the thickness of the watch, thus on the exterior of the middle part as in conventional chronograph watches with metal push buttons. Moreover, the elastomer head may advantageously be heat over moulded (also called duplicate moulding) onto the case, as will be described hereinafter, which assures solid and durable connection between the elastomeric material and the plastic material of the case. The elastomer head also has the advantage of absorbing accidental shocks on the push button, thereby also avoiding causing damage to the inside of the watch.

The stem may be made of a hard plastic material and in particular of the same plastic material as the case, which allows it to be moulded at the same time as the case. The stem may be made in a single piece with the case, by being connected thereto on one side by a flexible portion, or may be separate from the case being connected thereto solely by the elastomer head.

In another embodiment, the stem may be made of elastomeric material and be made in a single piece with the flexible head.

Another aspect of the invention concerns a method for manufacturing an assembly comprising a hard plastic watch case and at least one push button having a stem and a flexible head projecting outside the case, the stem extending from the head through a lateral opening of the case, the flexible head being attached to the stem and the case and closing in a sealed manner said opening, the method being characterised in that the flexible head is moulded by injecting an elastomeric material which connects itself in a sealed manner to an external surface of the case around the opening, and in that the method comprises the following steps:

(I) injecting the plastic material into a mould to form at least the case, (II) modifying part of the mould in the region of the push button head, and (III) injecting the elastomeric material in said part of the mould to form at least the flexible head so that said head is heat bonded to said external surface of the case.

An injection moulding method using two materials (also called two-shot moulding) is thus used, which is particularly efficient and economical because it only uses a single mould for making the watch case and its push button or buttons. Moreover, this method assures impeccable positioning of each push button stem with respect to the case and thus the movement.

In a particular way of implementing the method, the push button stem is made of the same plastic material as the case and is moulded during step (I).

In another way of implementing the method, the push button stem is made of the same elastomeric material as the flexible head and is moulded during step (III).

Other characteristics and advantages of the present invention will become clear during the following description of different embodiment examples, given by way of non-limiting example with reference to the attached drawings, in which:

FIG. 1 is a partial front view of a plastic watch case, partially cut away in the area of a push button, in a first embodiment of the invention;

FIG. 2 is a cross-section along line II—II of FIG. 1;

FIG. 3 is a similar view to FIG. 1, for a second embodiment of the invention, and FIG. 4 is a partial cross-section illustrating another embodiment of the invention.

FIGS. 1 and 2 show schematically a wristwatch case 2 made of a hard thermoplastic material such as ABS or similar. Case 2 comprises a back cover 3 and a middle part 4 on which, in the present case, are provided two lateral push buttons 5. One or more other push buttons may be provided on the opposite side of the case. Case 2 defines a circular central cavity 6 in which, in a conventional manner, a clockwork movement, display means and possibly other elements, in particular electronic modules will be placed. A control stem (not shown) may be provided through middle part 4, in particular between the two push buttons 5 shown. These push buttons are preferably identical or symmetrical to each other and act along respective axes 7 directed towards the centre 8 of the case.

Each push button 5 according to FIGS. 1 and 2 comprises mainly an elongated stem 10, preferably having a slightly conical or prismatic cylindrical shape, oriented along axis 7 into a lateral opening 11 of middle part 4, and a flexible head 12 projecting outside case 2. Head 12 has here an external surface 13 in the shape of an elongated bell, which is connected in a smooth manner to the adjacent external surface of case 2. Head 12 is made of a relatively soft elastomeric material, for example of the TPEE kind, heat injection moulded so that it is connected both to a first end 14 of stem 10 and to a portion of external surface 15 of case 2 which surrounds opening 11. The portion of surface 15 is preferably hollow to arrange a sufficient thickness of the elastomeric material on the periphery of head 12. Elastomer head 12 and the connection between the two materials on the portion of surface 15 assure the sealing of the case in the area of opening 11. End 14 of stem 10 may have projecting parts embedded in the elastomeric material in order to reinforce the connection thereof with head 12.

In the example of FIG. 1, stem 10 is connected to case 2 by a flexible portion 16 in the shape of a strip extending into opening 11 and acting as the push button return spring, in co-operation with the elastic return movement of flexible head 12. In order to facilitate the flexion of head 12, a thin lateral gap 17 is provided around external end 14 of stem 10, except on the side of flexible portion 16, against which the head may abut.

On the side of internal cavity 6, the second end of stem 10 has a frontal support surface 18 which may have any appropriate shape for co-operating with the element of the movement which it has to push, for example an electric contact element or a moving metal part. If necessary, a flexible metal leaf (not shown) fixed to case 2 may be interposed between frontal surface 18 and the movement in order to protect the plastic material of stem 10. Under the effect of a manual pressure applied to external surface 13, the deformation of flexible head 12 and flexible portion 16 cause a travel C of stem 10 to an active position shown in dot-and-dash line. When such pressure is released, the stem is brought back to the rest position via the elasticity of the material. Its frontal surface 18 may thus advantageously be situated close to a peripheral internal surface 20 of cavity 6, which facilitates assembly of the movement.

The construction described hereinbefore has the advantage of being able to be manufactured by a two-shot injection moulding method, i.e. a single mould is used into which two different materials are successively injected. In a first step, the mould is provided with a part which occupies the place of flexible head 12 and the hard plastic forming case 12 with stem 10 and flexible portion 16 is injected therein. Said part of the mould is then replaced in order to mould flexible head 12 and the elastomeric material, which heat bonds to stem 10 and to surface 15 of case 2, is injected into this region. After opening the mould, a finished case having the desired number of push buttons along its middle part is obtained, this number being for example of between one and four. Since the manufacturing method is inexpensive, cases having different numbers of push buttons may easily be manufactured, or a case having for example four push buttons with a movement requiring only three push buttons may be used if this is justified by economical or aesthetic reasons.

FIG. 3 shows an alternative to the construction of FIGS. 1 and 2, the difference being that stem 10 is separate from case 2, to which it is only connected by elastomer flexible head 12. In this case, opening 11 of the case simply has a cylindrical shape, surrounds completely stem 10 and is extended aria annular-shaped gap 17. If stem 10 is made of the same hard plastic material as case 2, this construction may be manufactured via the same method as in the preceding example. Conversely, if stem 10 may also be made of a different material, either by prefabrication, or by injection into the same mould. The return movement of the push button is assured solely by the elasticity of the elastomer of head 12.

In the two embodiments illustrated by FIGS. 1 to 3, one may also make end 14 of plastic stem 10 apparent on external surface 13 of the elastomer head, to form a sort of button. This button may either be prominent or flush with surface 13.

In another alternative, shown schematically in FIG. 4, stem 10 of push button 5 is made of the same elastomeric material as flexible head 12, to which it is connected by its first end 14, the push button being thus made of a single part. In order to have sufficient rigidity, stem 10 may have any appropriate traversal section, in particular a section in the shape of a cross, in the present case. In this case also, one may use the injection moulding method using two materials described hereinbefore, by successively injecting into a same mould the hard plastic material of case 2, then the elastomeric material of push button 5.

The examples given hereinbefore demonstrate that the invention allows a watch case provided with push buttons to be manufactured in an extremely simple and economical manner, avoiding numerous problems connected to manufacturing, mounting and sealing of conventional mechanical push buttons. The invention applies both to mechanical chronographs and to electronic watches whose push buttons only actuate, for example, electric contacts.

What is claimed is:

1. A method for manufacturing an assembly comprising a hard thermoplastic watch case having an outside and an internal cavity and at least one push button having a stem and a flexible head projecting outside said case and fixed in a sealed manner onto an external surface of said case lying outside of and around a lateral opening of said case, said stem extending from said head through a lateral opening of said case, said flexible head being attached to said stem and said case and closing in a sealed manner said opening, said stem extendable into the internal cavity of said case when a pressure is applied onto said flexible head, wherein said flexible head is moulded by injecting an elastomeric material which is connected in a sealed manner to an external surface of said case around said opening, and wherein the method comprises the following steps:

(I) injecting said plastic material into a mould to form at least said case, (II) modifying part of said mould in the region of said push button head, and (III) injecting said elastomeric material into said part of the mould to form at least said flexible head so that it is heat bonded to said external surface of said case.

2. The method of claim 1, wherein said stem is separate from said case, to which it is connected by said flexible head.

3. The method of claim 1, wherein said push button stem is made of the same elastomeric material as said flexible head and is moulded during step (III).

4. The method of claim 1, wherein said push button stem is made of the same plastic material as said case and is moulded during step (I).

5. The method of claim 4, wherein said stem is made in a single piece with said case, to which it is connected on one side by a flexible portion.

6. The method of claim 5, wherein said flexible portion is situated in said opening.

7. The method of claim 4, wherein said stem is separate from said case, to which it is connected by said flexible head.

* * * * *